United States Patent
Niitsuma et al.

(10) Patent No.: US 10,860,331 B2
(45) Date of Patent: Dec. 8, 2020

(54) INFORMATION PROCESSING APPARATUS WITH SEMICONDUCTOR INTEGRATED CIRCUITS, CONTROL METHOD THEREFOR, AND STORAGE MEDIUM

(71) Applicant: CANON KABUSHIKI KAISHA, Tokyo (JP)

(72) Inventors: Hiroaki Niitsuma, Yokohama (JP); Toshio Yoshihara, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/680,470

(22) Filed: Aug. 18, 2017

(65) Prior Publication Data
US 2018/0060081 A1 Mar. 1, 2018

(30) Foreign Application Priority Data
Aug. 26, 2016 (JP) .................... 2016-165740

(51) Int. Cl.
*G06F 9/44* (2018.01)
*H04N 1/00* (2006.01)
(Continued)

(52) U.S. Cl.
CPC .......... *G06F 9/4403* (2013.01); *G06F 9/4401* (2013.01); *H04N 1/00928* (2013.01); (Continued)

(58) Field of Classification Search
CPC . G06F 9/4401; G06F 9/4403; H04N 1/00928; H04N 1/32448; H04N 1/40; H04N 2201/0094
See application file for complete search history.

(56) References Cited

U.S. PATENT DOCUMENTS 9,350,890 B2 * 5/2016 Shintani ............ H04N 1/00928
9,940,560 B2 * 4/2018 Oyoshi .................. G06F 13/00
(Continued)

FOREIGN PATENT DOCUMENTS

CN        1992767 A     7/2007
CN      101005551 A     7/2007
(Continued)

OTHER PUBLICATIONS

Office Action issued in Japanese Appln. No. 2016-165740 dated Jul. 14, 2020.
(Continued)

*Primary Examiner* — Fahmida Rahman
(74) *Attorney, Agent, or Firm* — Rossi, Kimms & McDowell LLP

(57) ABSTRACT

An information processing which reduces production costs. The information processing apparatus has a first semiconductor device, a second semiconductor device, a ROM that stores both a first boot program and a second boot program, and an interface for communicating with the ROM. In response to the first semiconductor device being reset, the first semiconductor device reads out the first boot program from the ROM via the interface. In response to the second semiconductor device being reset, the second semiconductor device reads out the second boot program from the ROM via the interface. While the first semiconductor device is reading out the first boot program from the ROM, an output from the second semiconductor device to the interface is controlled to have high impedance.

17 Claims, 11 Drawing Sheets

(51) Int. Cl.
*G06F 9/4401* (2018.01)
*H04N 1/32* (2006.01)
*H04N 1/40* (2006.01)

(52) U.S. Cl.
CPC ........... *H04N 1/32448* (2013.01); *H04N 1/40* (2013.01); *H04N 2201/0094* (2013.01)

(56) References Cited

U.S. PATENT DOCUMENTS

| | | | | |
|---|---|---|---|---|
| 2006/0075150 A1* | 4/2006 | Hwang | .................... | H04N 1/00 710/14 |
| 2007/0206211 A1* | 9/2007 | Okutsu | ................. | G03G 15/50 358/1.14 |
| 2007/0220501 A1* | 9/2007 | Yanagawa | ............... | G06F 9/445 717/162 |
| 2014/0173315 A1* | 6/2014 | Yokoyama | ............ | G06F 1/3231 713/323 |
| 2014/0380016 A1* | 12/2014 | Matsunaga | ............. | G06F 12/06 711/171 |

FOREIGN PATENT DOCUMENTS

| | | |
|---|---|---|
| JP | H04177452 A | 6/1992 |
| JP | H0855097 A | 2/1996 |
| JP | 2010015295 A | 1/2010 |
| JP | 2014081781 A | 5/2014 |
| JP | 2015149025 A | 8/2015 |
| JP | 2015207950 A | 11/2015 |
| WO | 2014084150 A1 | 6/2014 |

OTHER PUBLICATIONS

Office Action issued in Chinese Appln. No. 201710740156.7 dated Sep. 15, 2020. English translation provided.

* cited by examiner

INFORMATION PROCESSING APPARATUS WITH SEMICONDUCTOR INTEGRATED CIRCUITS, CONTROL METHOD THEREFOR, AND STORAGE MEDIUM

BACKGROUND OF THE INVENTION

Field of the Invention

The present invention relates to an information processing apparatus, a control method therefor, and a storage medium, and in particular to an information processing apparatus with semiconductor integrated circuits, a control method therefor, and a storage medium.

Description of the Related Art

An MFP (Multi Function Printer) which is an information processing apparatus carrying out an initialization process at the time of startup is known. The MFP has a plurality of semiconductor integrated circuits and a plurality of ROMs for the respective semiconductor integrated circuits, and boot programs for carrying out initialization processes for the respective semiconductor integrated circuits are stored in the respective ROMs. In recent years, an arrangement which reduces parts count for the MFP, for example, the number of ROMs storing the boot programs has been studied from the standpoint of reducing production costs for the MFP. As an example of this arrangement, an arrangement in which only one ROM is provided for a plurality of semiconductor integrated circuits is considered, but this arrangement may cause communication failures due to concentrated access to the one ROM from the plurality of semiconductor integrated circuits. To address this problem, an arrangement in which for the plurality of semiconductor integrated circuits, one shared memory freely accessible by the plurality of semiconductor integrated circuits is provided in addition to the one ROM is known (see Japanese Laid-Open Patent Publication (Kokai) No. H04-177452 and Japanese Laid-Open Patent Publication (Kokai) No. 2014-81781). This would prevent concentrated access to the one ROM from the plurality of semiconductor integrated circuits even if the number of ROMs is reduced.

However, according to the technique described in Japanese Laid-Open Patent Publication (Kokai) No. H04-177452 and Japanese Laid-Open Patent Publication (Kokai) No. 2014-81781, production costs for the MFP cannot be reduced to a satisfactory level because the shared memory is provided in addition to the ROM in which the boot programs are stored.

SUMMARY OF THE INVENTION

The present invention provides an information processing apparatus and a control method therefor which reduce production costs, as well as a storage medium.

Accordingly, the present invention provides an information processing apparatus comprising a first semiconductor device, a second semiconductor device, a storage unit configured to store both a first boot program and a second boot program, and an interface for communicating with the storage device, wherein in response to the first semiconductor device being reset, the first semiconductor device reads out the first boot program from the storage unit via the interface, in response to the second semiconductor device being reset, the second semiconductor device reads out the second boot program from the storage unit via the interface, and while the first semiconductor device is reading out the first boot program from the storage unit, an output from the second semiconductor device to the interface is controlled to have high impedance.

According to the present invention, production costs are reduced.

Further features of the present invention will become apparent from the following description of exemplary embodiments (with reference to the attached drawings).

DESCRIPTION OF THE EMBODIMENTS

Hereafter, embodiments of the present invention will be described in detail with reference to the drawings.

In the following description of the present embodiment, it is assumed that the present invention is applied to an MFP which is an information processing apparatus, but the present invention should not necessarily be applied to the MFP but may be applied to, for example, an apparatus that has a plurality of semiconductor devices and carries out an initialization process for the plurality of semiconductor devices.

Figure 1:
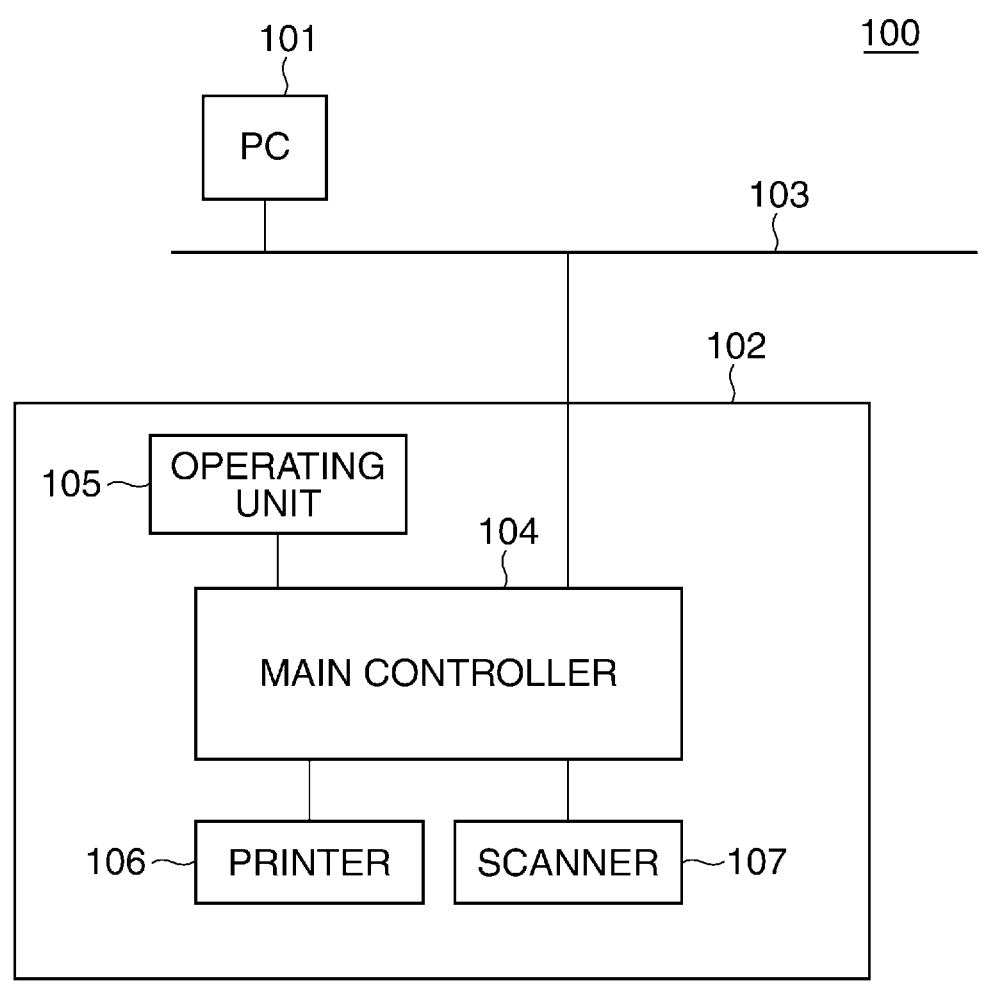
FIG. 1 is a block diagram schematically showing an arrangement of a communication system including an MFP which is an information processing apparatus according to a first embodiment of the present invention.

FIG. 1 is a block diagram schematically showing an arrangement of a communication system 100 including an MFP 102 which is an information processing apparatus according to a first embodiment of the present invention.

Referring to FIG. 1, the communication system 100 has a PC (personal computer) 101 and the MFP 102, which are connected together via a LAN 103. The MFP 102 has a main controller 104, an operating unit 105, a printer 106, and a scanner 107.

The PC 101 sends execution data for executing jobs to the MFP 102. The MFP 102 is able to execute such jobs as copying and scanning and for example, executes a copy job based on print data obtained from the PC 101 via the LAN 103. The main controller 104 centrally controls the entire MFP 102. The operating unit 105 is a user interface of the MFP 102 and receives input information input by a user. The printer 106 performs printing on a sheet based on, for example, print data obtained from the PC 101 or image data generated by the scanner 107. The scanner 107 reads an original placed on an original platen glass, not shown, to generate image data.

Figure 2A:
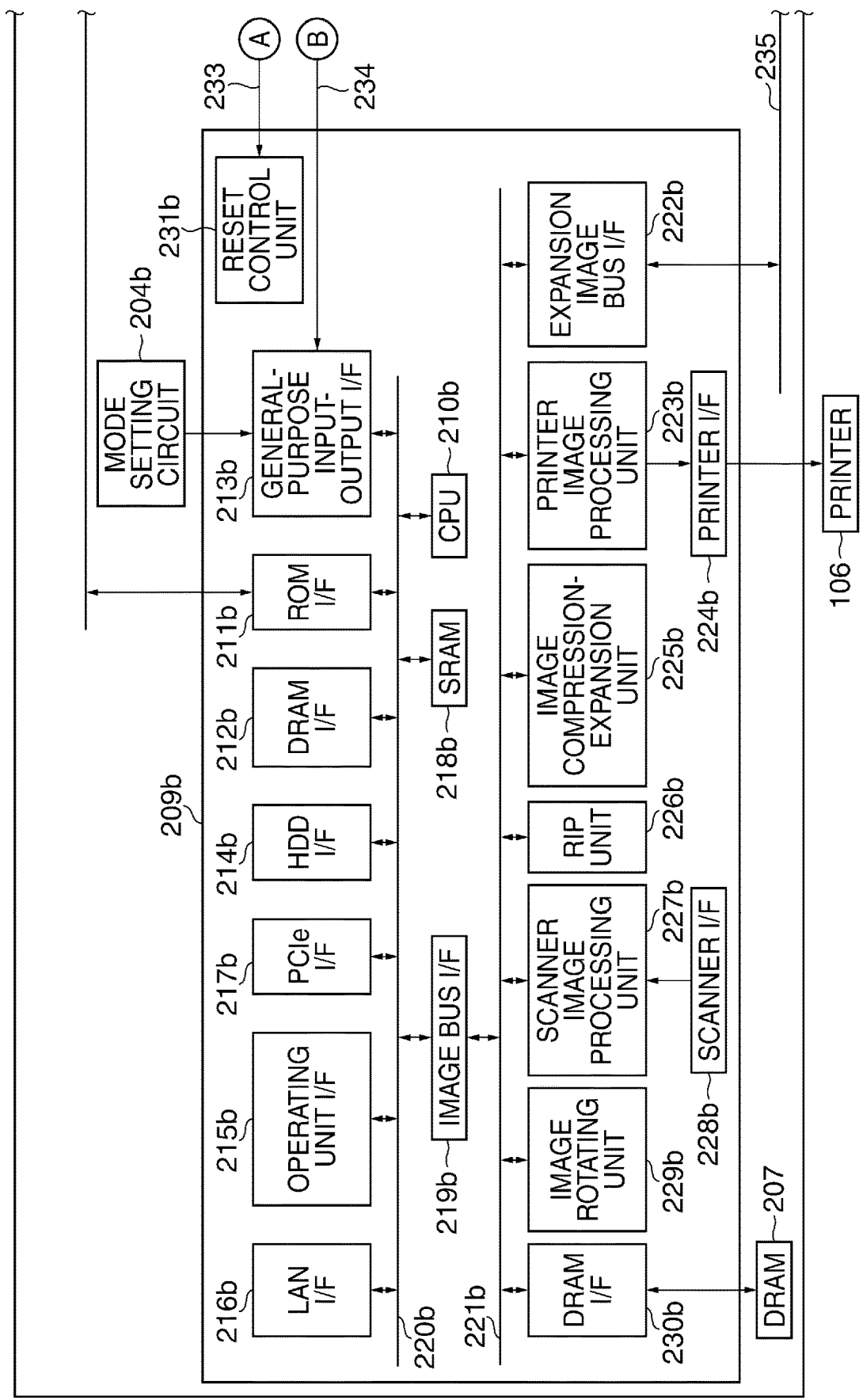
FIGS. 2A and 2B are block diagrams schematically showing an arrangement of a main controller in FIG. 1.
Figure 2B:
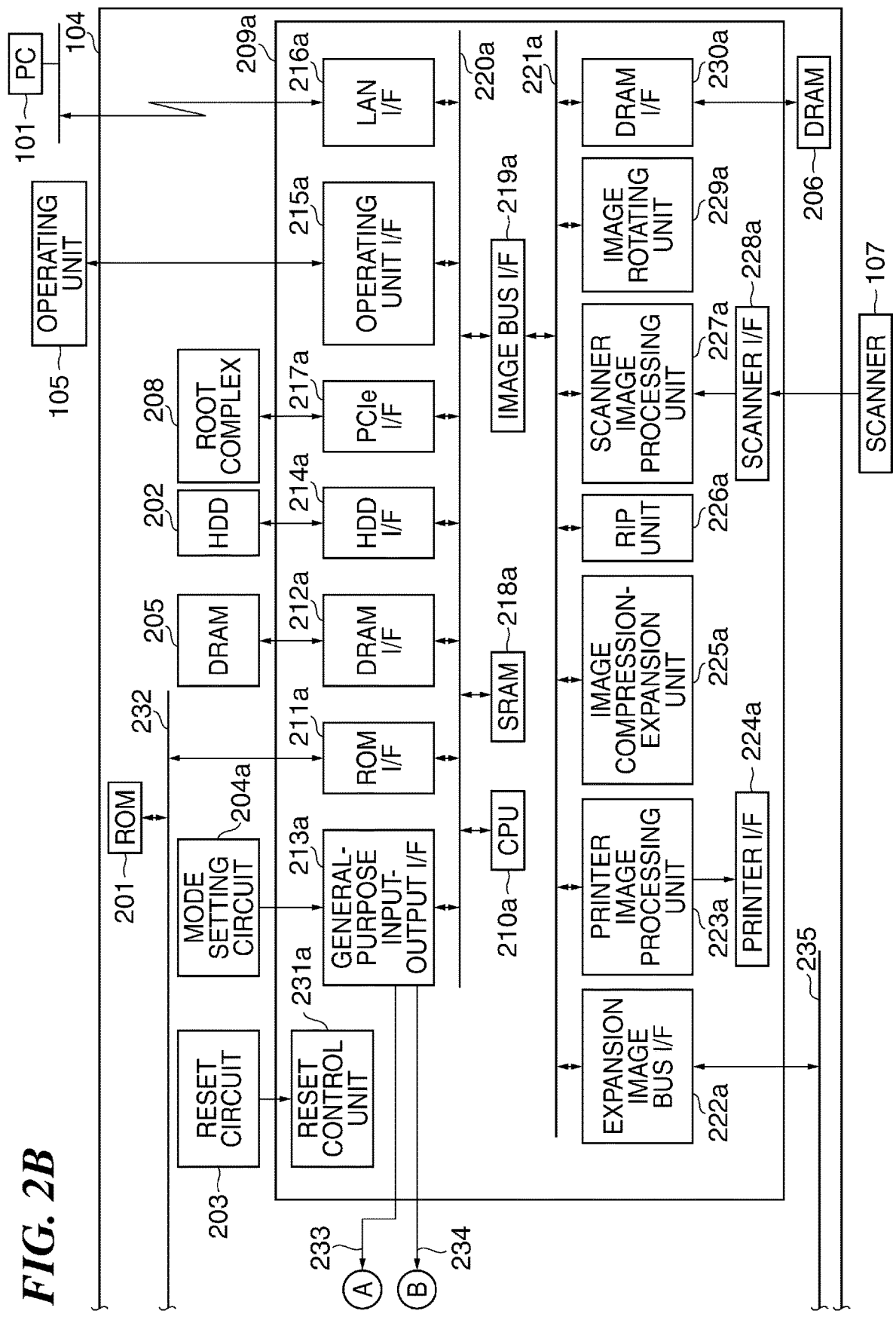

FIGS. 2A and 2B are block diagrams schematically showing an arrangement of the main controller 104 in FIG. 1.

Referring to FIGS. 2A and 2B, the main controller 104 has a ROM 201, an HDD 202, a reset circuit 203, mode setting circuits 204a and 204b, DRAMs 205 to 207, a root complex 208, and semiconductor integrated circuits 209a and 209b (a first semiconductor device and a second semiconductor device). The ROM 201 is connected to the semiconductor integrated circuits 209a and 209b via one ROM bus 232 (interface), and the semiconductor integrated circuits 209a and 209b are connected together via buses 233 and 234 and an expansion image bus 235. The semiconductor integrated circuit 209a is connected to the HDD 202, the reset circuit 203, the mode setting circuit 204a, the DRAMs 205 and 206, and the root complex 208. The semiconductor integrated circuit 209b is connected to the mode setting circuits 204b and the DRAM 207.

The ROM 201 stores a plurality of pieces of initialization execution data for executing initialization processes for the respective semiconductor integrated circuits 209a and 209b. The pieces of initialization execution data are different pieces of data for the respective semiconductor integrated circuits 209a and 209b. The initialization execution data includes, for example, setting values for use in executing initialization processes for the DRAMs 205 to 207 and a PCIe (PCI Express) system of the MFP 102, and boot programs for booting CPUs 210a and 210b, to be described later, of the respective semiconductor integrated circuits 209a and 209b. The HDD 202, which is a nonvolatile storage device, stores programs for executing, for example, an OS (operating system) module of the MFP 102. The reset circuit 203 controls execution of a resetting process for modules of the semiconductor integrated circuit 209a. The mode setting circuits 204a and 204b set operating modes, to be described later, of the semiconductor integrated circuits 209a and 209b. The DRAMs 205 and 206 are used as work areas for the semiconductor integrated circuit 209a and temporary storage areas for a variety of data. The DRAM 207 is used as a work area for the semiconductor integrated circuit 209b and a temporary storage area for a variety of data. The root complex 208 is a module for implementing the PCIe system of the MFP 102.

The semiconductor integrated circuits 209a and 209b are semiconductor devices with the same arrangement on which the same silicon die is mounted. The semiconductor integrated circuits 209a and 209b have a main mode in which they control startup of a system of the MFP 102 and control the entire MFP 102 and an expansion mode in which they mainly provide control relating to one of functions which the MFP 102 has, i.e. a printing function of the MFP 102. The semiconductor integrated circuits 209a and 209b operates in the main mode or the expansion mode in accordance with settings made by the mode setting circuits 204a and 204b. The present embodiment is based on the assumption that, for example, the semiconductor integrated circuit 209a is placed in the main mode in which it controls the modules of the MFP 102 except the printer 106, and the semiconductor integrated circuit 209b is placed in the expansion mode in which it mainly controls the printer 106. Since the semiconductor integrated circuits 209a and 209b have the same arrangement, the following description of their arrangement is given by taking the semiconductor integrated circuit 209a as an example.

The semiconductor integrated circuit 209a has a CPU 210a, a ROM I/F 211a, a DRAM I/F 212a, a general-purpose input-output I/F 213a, an HDD I/F 214a, an operating unit I/F 215a, a LAN I/F 216a, a PCIe I/F 217a, and an SRAM 218a. The semiconductor integrated circuit 209a also has an image bus I/F 219a, an expansion image bus I/F 222a, a printer image processing unit 223a, a printer I/F 224a, an image expansion-compression unit 225a, and a RIP (raster image processor) unit 226a. The semiconductor integrated circuit 209a also has a scanner image processing unit 227a, a scanner I/F 228a, an image rotating unit 229a, a DRAM I/F 230a, and a reset control unit 231a. The CPU 210a, the ROM I/F 211a, the DRAM I/F 212a, the general-purpose input-output I/F 213a, the HDD I/F 214a, the operating unit I/F 215a, the LAN I/F 216a, the PCIe I/F 217a, and the SRAM 218a are connected to one another via a system bus 220a. The expansion image bus I/F 222a, the printer image processing unit 223a, the image expansion-compression unit 225a, the RIP unit 226a, the scanner image processing unit 227a, the image rotating unit 229a, and the DRAM I/F 230a are connected to one another via an image bus 221a. The printer I/F 224a is connected to the printer image processing unit 223a, and the scanner I/F 228a is connected to the scanner image processing unit 227a. The system bus 220a is connected to the image bus 221a via the image bus I/F 219a.

The CPU 210a executes programs stored in the ROM 201, the HDD 202, and so forth to provide a variety of control. The ROM I/F 211a carries out data communications with the ROM 201. The DRAM I/F 212a carries out data communications with the DRAM 205. For example, the DRAM I/F 212a stores setting values and intermediate data, which is for use in the variety of control provided by the CPU 210a, in the DRAM 205. The general-purpose input-output I/F 213a carries out data communications with the mode setting circuit 204a and the semiconductor integrated circuit 209b. For example, the general-purpose input-output I/F 213a manages information indicative of an operating mode setting made by the mode setting circuit 204a. The general-purpose input-output I/F 213a also outputs a control signal, for example, a reset signal 310b, to be described later, which controls execution of a resetting process for the semiconductor integrated circuit 209b, to the semiconductor integrated circuit 209b. The HDD I/F 214a carries out data communications with the HDD 202, the operating unit I/F 215a carries out data communications with the operating unit 105, and the LAN I/F 216a carries out data communications with the PC 101. The PCIe I/F 217a, which is an interface conforming to PCIe standards, carries out data communications with the root complex 208. The SRAM 218a is a small-capacity storage device, and for example, the boot program read out from the ROM 201 is expanded into the SRAM 218a.

The image bus I/F 219a is an interface for transferring image data at high speed between the system bus 220a and the image bus 221a. The expansion image bus I/F 222a is an interface module for sending and receiving image data to and from the semiconductor integrated circuit 209b. Thus, the semiconductor integrated circuits 209a and 209b play separate roles in image processing, and more specifically, the semiconductor integrated circuit 209a performs image processing (first image processing) on input data using the scanner 107 to generate intermediate data, and the semiconductor integrated circuit 209b performs image processing (second image processing) on the intermediate data using the printer 106. As a result, high-speed image processing is possible.

The printer image processing unit 223a performs image processing such as a color conversion process, a filtering process, and a resolution conversion process on image data for which a copy job is to be executed. The printer I/F 224a carries out data communications with the printer 106. The image expansion-compression unit 225a subjects multivalued data to a JPEG compression-expansion process and subjects binary-coded data to a JBIG compression-expansion process. The RIP unit 226a converts PDL (page description language) data, which is print data obtained from the PC 101, into a bitmap image. The scanner image processing unit 227a carries out such processes as correction, processing, and editing to image data generated by the scanner 107. The scanner I/F 228a carries out data communications with the scanner 107, and the image rotating unit 229a carries out a rotation process for image data. The DRAM I/F 230a carries out data communications with DRAM 206, and for example, stores image data, which is communicated through the image bus 221a, in the DRAM 206. The reset control unit 231a resets the modules of the semiconductor integrated circuit 209a.

Figure 3:
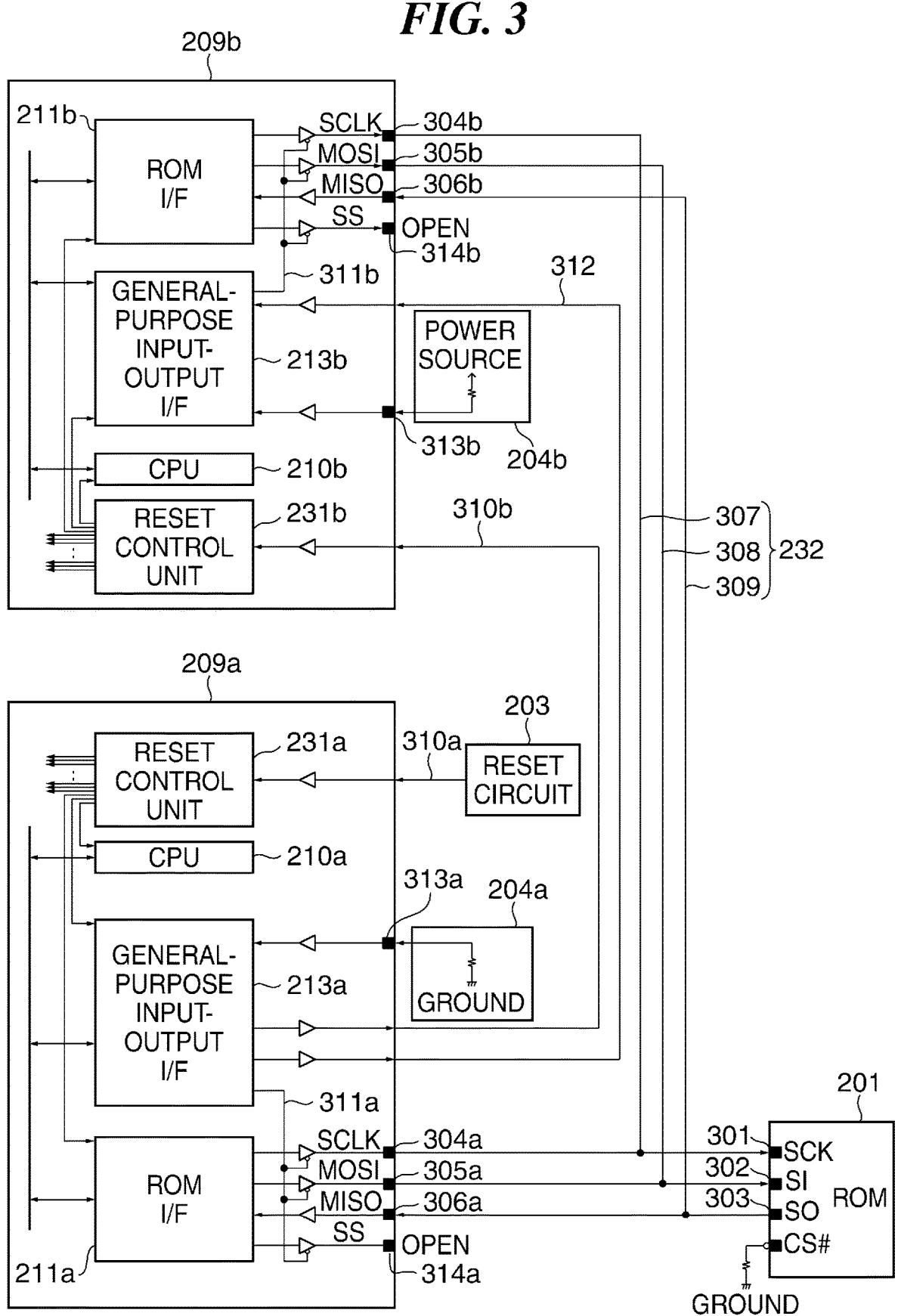
FIG. 3 is a diagram useful in explaining how semiconductor integrated circuits and a ROM in FIGS. 2A and 2B are connected to one another.

FIG. 3 is a diagram useful in explaining how the semiconductor integrated circuits 209a and 209b and the ROM 201 in FIGS. 2A and 2B are connected one another.

Referring to FIG. 3, the ROM 201 has an SCK 301, an SI 302, and an SO 303, which are terminals carrying out data communications with the semiconductor integrated circuits 209a and 209b. The semiconductor integrated circuit 209a has an SCLK 304a, a MOSI 305a, and a MISO 306a which are terminals carrying out data communications with the ROM 201, a control terminal 313a for setting the operating mode of the semiconductor integrated circuit 209a, and an SS 314a. The semiconductor integrated circuit 209b has an SCLK 304b, a MOSI 305b, and a MISO 306b which are terminals carrying out data communications with the ROM 201, a control terminal 313b for setting the operating mode of the semiconductor integrated circuit 209b, and an SS 314b. The SCK 301 and the SCLKs 304a and 304b are connected to one another by one signal line 307, the SI 302 and the MOSIs 305a and 305b are connected to one another by one signal line 308, and the SO 303 and the MISOs 306a and 306b are connected to one another by one signal line 309. Both the SS 314a and the SS 314b are connected to none of those signal lines. On the signal line 307, a clock signal for use in reading out the initialization execution data stored in the ROM 201 is output from either of the semiconductor integrated circuits 209a and 209b to the ROM 201. On the signal line 308, a command which requests obtainment of the initialization execution data (hereafter referred to as "the obtainment request command") is output from either of the semiconductor integrated circuits 209a and 209b to the ROM 201. On the signal line 309, the initialization execution data stored in the ROM 201 is output from the ROM 201 to the semiconductor integrated circuits 209a and 209b. A control terminal 313a is set at a low level indicative of the main mode, and a control terminal 313b is set at a high level indicative of the expansion mode.

In the MFP 102, the reset circuit 203 is connected to the semiconductor integrated circuit 209a placed in not the expansion mode but the main mode in which the functions associated with the startup of the system of the MFP 102 are performed. The resetting process for the semiconductor integrated circuit 209a is controlled based on a reset signal 310a output from the reset circuit 203. On the other hand, the resetting process for the semiconductor integrated circuit 209b is controlled based on a reset signal 310b output from the semiconductor integrated circuit 209a. Upon receiving the low-level reset signals 310a and 310b which order execution of the resetting processes, the semiconductor integrated circuits 209a and 209b reset their modules. After resetting the modules, the semiconductor integrated circuits 209a and 209b maintain the reset state until they are instructed to terminate the reset state. On the other hand, upon receiving the high-level reset signals 310a and 310b which order termination of the reset state, the semiconductor integrated circuits 209a and 209b terminate the reset state of their modules.

In the MFP 102, access to the ROM 201 from the semiconductor integrated circuits 209a and 209b is controlled by the respective general-purpose input-output I/Fs 213a and 213b. For example, in the semiconductor integrated circuit 209a, an enable signal 311a output from the general-purpose input-output I/F 213a controls outputs from the SCLK 304a and the MOSI 305a. In the semiconductor integrated circuit 209b, the general-purpose input-output I/F 213b generates an enable signal 311b based on a buffer control signal 312 output from the general-purpose input-output I/F 213a to the general-purpose input-output I/F 213b, and outputs from the SCLK 304b and the MOSI 305b are controlled by the enable signal 311b. It should be noted that outputs from the SSs 314a and 314b connected to none of the signal lines may not be controlled based on the enable signals 311a and 311b.

A description will now be given of an initialization processes which are carried out by the semiconductor integrated circuits 209a and 209b when turning-on of the power to the main controller 104 is started.

Figure 4:
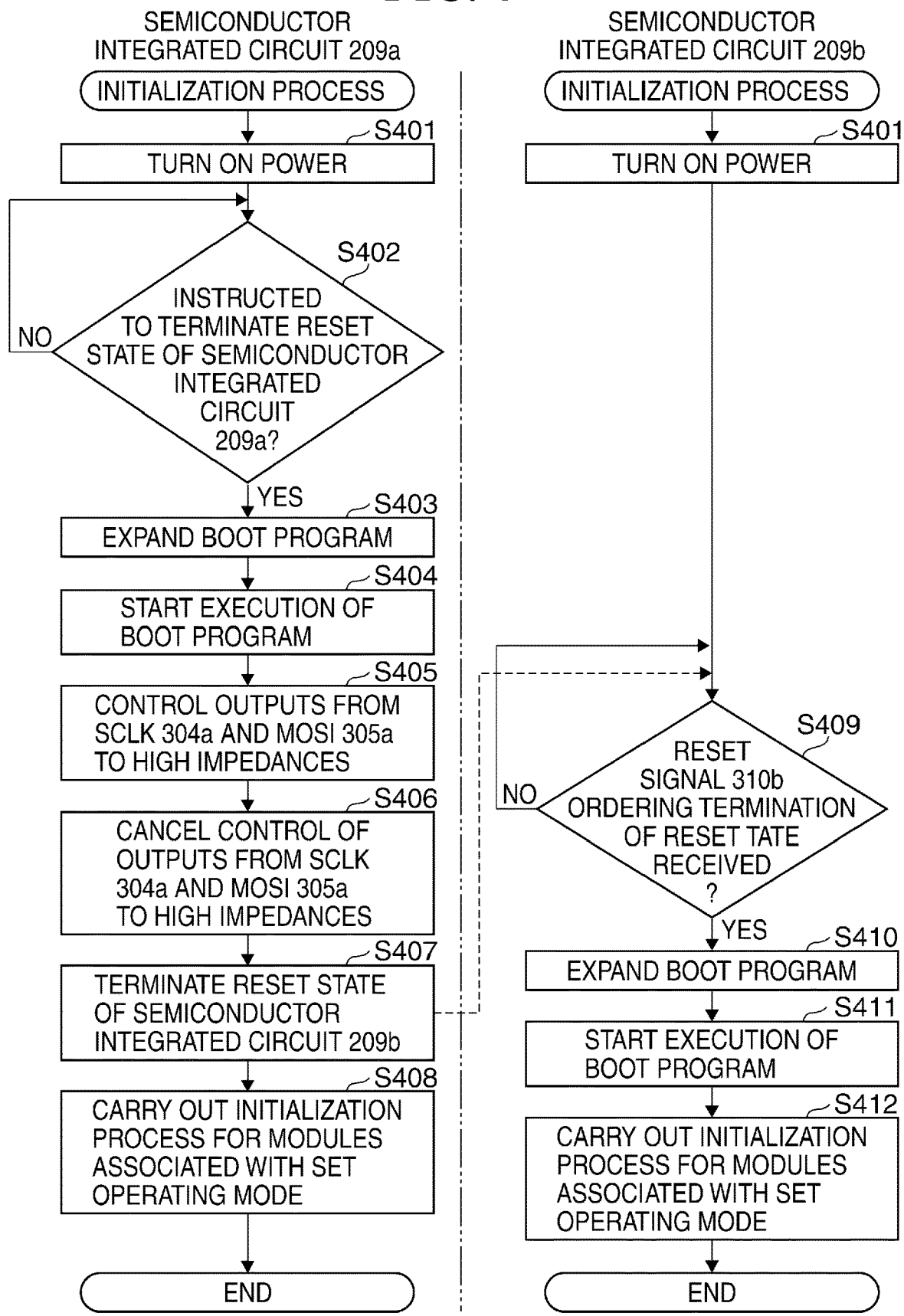
FIG. 4 is a flowchart showing the procedures of initialization processes which are carried out by the main controller in FIG. 1.

FIG. 4 is a flowchart showing the procedure of the initialization processes which are carried out by the main controller 104 in FIG. 1.

Here, in the MFP 102, the different initialization execution data for the semiconductor integrated circuits 209a and 209b is stored in the ROM 201, but the ROM bus 232 is only one connecting means for accessing the ROM 201 from the semiconductor integrated circuits 209a and 209b. For example, when the semiconductor integrated circuit 209a is to obtain the initialization execution data for the semiconductor integrated circuit 209a from the ROM 201, the semiconductor integrated circuit 209a outputs the obtainment request command for the initialization execution data to the ROM 201 via the ROM bus 232. The semiconductor integrated circuit 209a needs to continue outputting the obtainment request command to the ROM 201 until it completes obtainment of the initialization execution data. For this reason, when the semiconductor integrated circuit 209b accesses the ROM 201 while the semiconductor integrated circuit 209a is obtaining the initialization execution data, a signal conflict occurs on the ROM bus 232, and hence the initialization execution data that is needed cannot be obtained from the ROM 201. To prevent this signal conflict, use of an additional storage device different from the ROM 201 is conceivable, but this new storage device would increase production costs for the MFP 102.

To address this problem, in the present embodiment, while the semiconductor integrated circuit 209a out of the semiconductor integrated circuits 209a and 209b is accessing the ROM 201, outputs from the SCLK 304b and the MOSI 305b of the semiconductor integrated circuit 209b are controlled to have high impedance.

Figure 5:
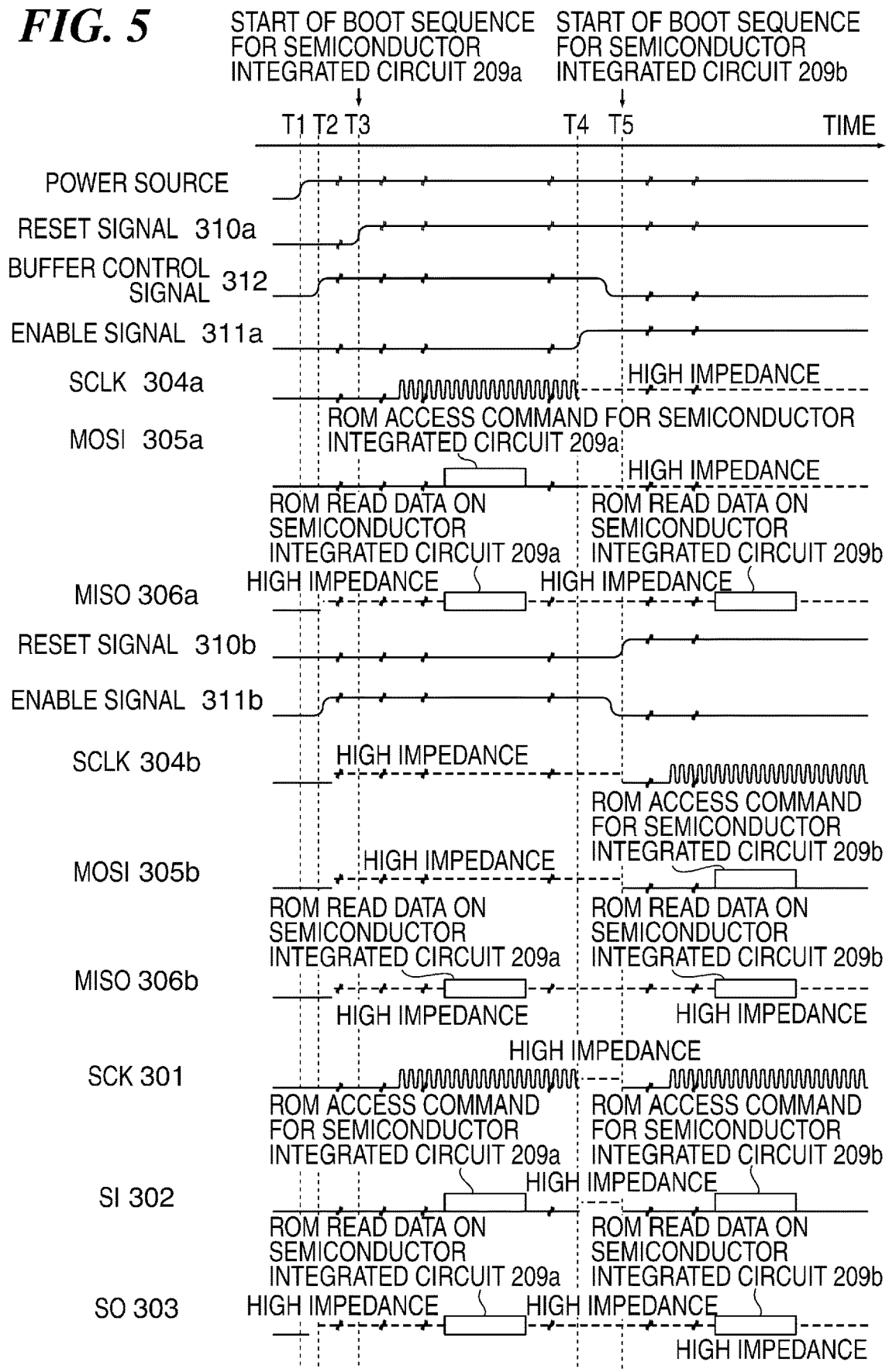
FIG. 5 is a diagram useful in explaining control signals which are sent by the main controller in FIG. 1.

Referring to FIG. 4, first, when turning-on of the power to the main controller 104 is started (step S401) (see, for example, a time period T1 in FIG. 5), power is supplied to the semiconductor integrated circuits 209a and 209b, the ROM 201, and the reset circuit 203 of the main controller 104. As a result, levels of signals at the respective terminals of the semiconductor integrated circuits 209a and 209b are determined, and the semiconductor integrated circuits 209a and 209b are instructed to execute the resetting process. In the semiconductor integrated circuit 209b, outputs from the SCLK 304b and the MOSI 305b to have high impedance by the enable signal 311b (see, for example, a time period T2 in FIG. 5).

Next, based on the reset signal 310a output from the reset circuit 203 to the semiconductor integrated circuit 209a, the main controller 104 determines whether or not an instruction to terminate the reset state of the semiconductor integrated circuit 209a has been issued (step S402). When the main controller 104 determines that the instruction to terminate the reset state of the semiconductor integrated circuit 209a has been issued (YES in the step S402) (see, for example, a time period T3 in FIG. 5), the modules of the semiconductor integrated circuit 209a including the CPU 210a become operable. After that, the CPU 210a reads out the boot program from the ROM 201. At this time, the outputs from the SCLK 304b and the MOSI 305b of the semiconductor integrated circuit 209b have been controlled to have high impedance. For this reason, the semiconductor integrated circuit 209b never accesses the ROM 201 via the ROM bus 232 while the semiconductor integrated circuit 209a is accessing the ROM 201.

Then, upon completing the readout of the boot program, the CPU 210a expands the boot program into the SRAM 218a (step S403). After that, the CPU 210a starts executing the boot program expanded into the SRAM 218a (step S404). The CPU 210a then uses the enable signal 311a to provide control such that outputs from the SCLK 304a and the MOSI 305a have high impedance (step S405) (see, for example, a time period T4 in FIG. 4). This prevents the semiconductor integrated circuit 209a from accessing the ROM 201 until the control causing the outputs from the SCLK 304a and the MOSI 305a to have high impedance is brought to an end. The CPU 210a then uses the buffer control signal 312 to terminate the control causing the outputs from the SCLK 304b and the MOSI 305b of the semiconductor integrated circuit 209b to have high impedance (step S406). This enables the semiconductor integrated circuit 209b to access the ROM 201. The CPU 210a then outputs the reset signal 310b, which orders termination of the reset state, to the reset control unit 231b from the general-purpose input-output I/F 213a to terminate the reset state of the semiconductor integrated circuit 209b (step S407). The CPU 210a then carries out an initialization process for the modules of the semiconductor integrated circuit 209a which are associated with the set operating mode (step S408) and ends the present process.

Upon receiving the reset signal 310b, which orders termination of the reset state, from the semiconductor integrated circuit 209a in the step S407 (step S409), the semiconductor integrated circuit 209b terminates the reset state. This makes the modules of the semiconductor integrated circuit 209b including the CPU 210b operable. After that, the CPU 210b reads out the boot program from the ROM 201. At this time, the outputs from the SCLK 304a and the MOSI 305a of the semiconductor integrated circuit 209a have been controlled to have high impedance. For this reason, the semiconductor integrated circuit 209a never accesses the ROM 201 via the ROM bus 232 while the semiconductor integrated circuit 209b is accessing the ROM 201. Then, upon completing the readout of the boot program, the CPU 210b expands the boot program into the SRAM 218b (step S410). After that, the CPU 210b starts executing the boot program expanded into the SRAM 218b (step S411) and then carries out the initialization process for the modules of the semiconductor integrated circuit 209b which are associated with the set operating mode and ends the present process.

According to the process in FIG. 4 described above, while the semiconductor integrated circuit 209a out of the semiconductor integrated circuits 209a and 209b is accessing the ROM 201, the outputs from the SCLK 304b and the MOSI 305b of the semiconductor integrated circuit 209b are controlled to have high impedance. Namely, since the semiconductor integrated circuit 209b never accesses the ROM 201 while the semiconductor integrated circuit 209a is accessing the ROM 201, a signal conflict never occurs on the ROM bus 232, and hence no additional ROM is needed for the purpose of avoiding the signal conflict. This reduces parts count for the MFP 102 and thus lowers production costs.

Moreover, according to the process in FIG. 4 described above, access to the ROM 201 from the semiconductor integrated circuit 209a placed in the main mode in which the functions associated with startup of the system of the MFP 102 are performed is given high priority. As a result, startup of the system of the MFP 102 is quickly started.

A description will now be given of a second embodiment of the present invention.

The second embodiment of the present invention is basically the same as the first embodiment described above in terms of construction and operation, differing from the first embodiment in that a main controller has a PMU (power management unit). Features of the construction and operation that are the same as in the first embodiment will thus not be described, only features different from those of the first embodiment being described below.

Figure 6A:
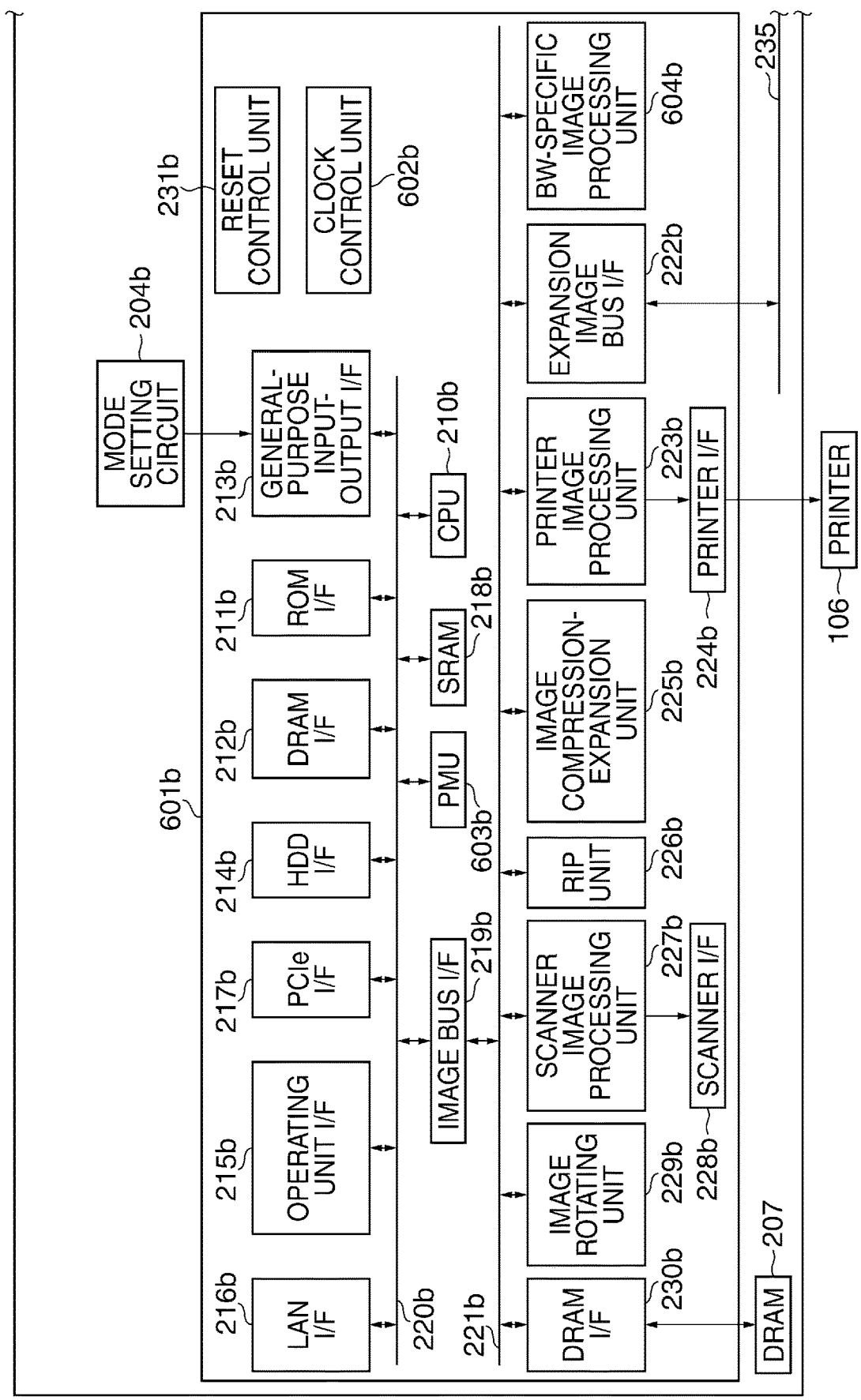
FIGS. 6A and 6B are block diagrams schematically showing an arrangement of a main controller according to a second embodiment of the present invention.
Figure 6B:
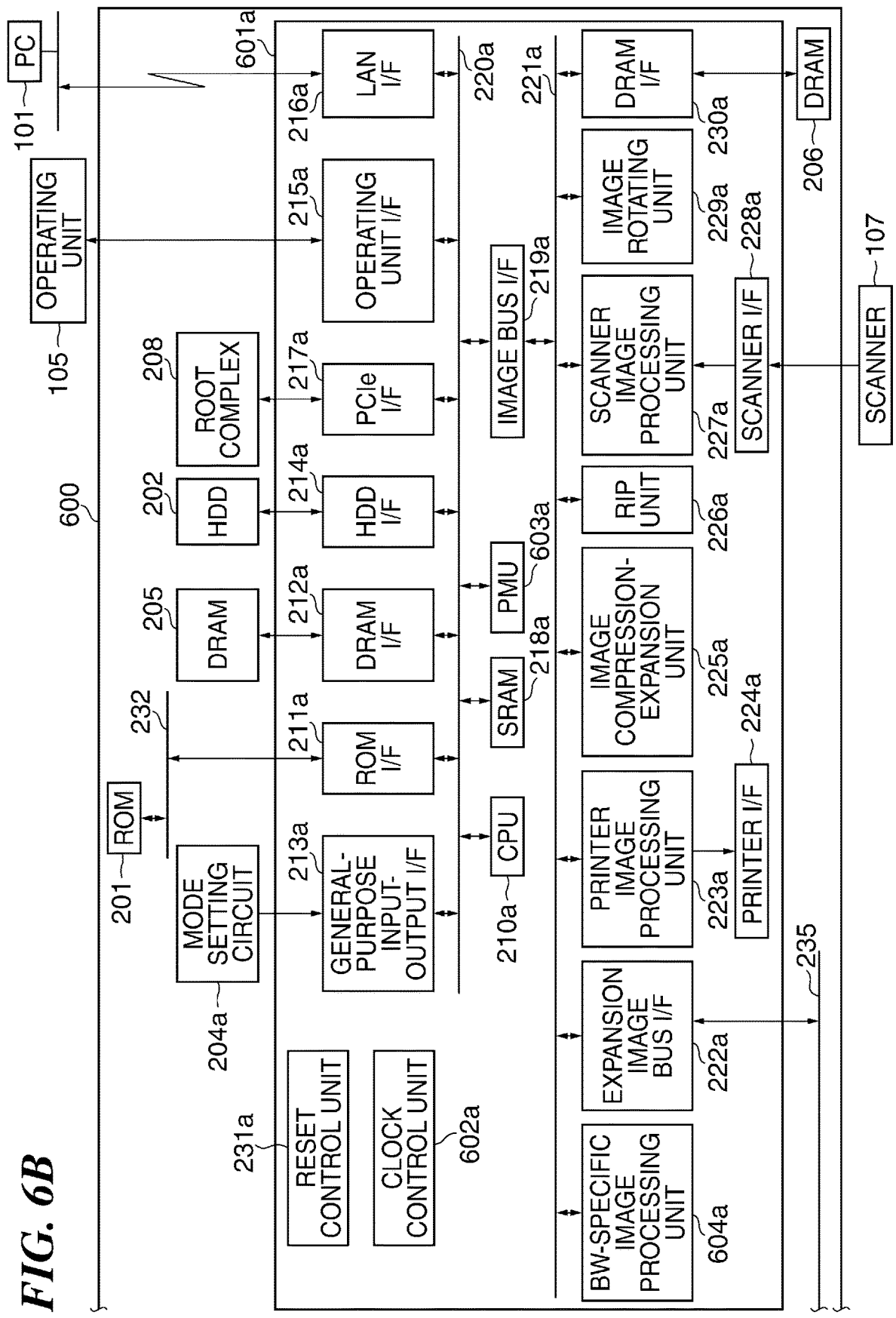

FIGS. 6A and 6B are block diagrams schematically showing an arrangement of the main controller 600 according to the second embodiment of the present invention.

Referring to FIGS. 6A and 6B, the main controller 600 has semiconductor integrated circuits 601a and 601b as well as the ROM 201, the HDD 202, the mode setting circuits 204a and 204b, the DRAMs 205 to 207, and the root complex 208 of the main controller 104. The ROM 201 is connected to the semiconductor integrated circuits 601a and 601b via the ROM bus 232, and the semiconductor integrated circuits 601a and 601b are connected together via the expansion image bus 235. The semiconductor integrated circuit 601a is connected to the HDD 202, the mode setting circuit 204a, the DRAMs 205 and 206, and the root complex 208. The semiconductor integrated circuit 601b is connected to the mode setting circuits 204b and the DRAM 207.

While the MFP 102 is running, the main controller 600 constantly supplies power to constantly-energized modules among modules of the semiconductor integrated circuits 601a and 601b. The constantly-energized modules are the general-purpose input-output I/Fs 213a and 213b, the reset control units 231a and 231b as well as clock control units 602a and 602b and PMUs 603a and 603b, to be described later. The main controller 600 also controls power-on/off of modules other than the constantly-energized modules among the modules of the semiconductor integrated circuits 601a and 601b. In the power-on/off control, power switches provided for the respective modules are turned on and off to physically control supply and shutoff of power. In the semiconductor integrated circuits 601a and 601b, power is supplied only the constantly-energized modules and the modules associated with the operating mode so as to reduce power consumption. It should be noted that although in the above description of the present embodiment, the supply of power to the semiconductor integrated circuits 601a and 601b is controlled as the way to reduce power consumption, the way to reduce power consumption should not be limited to the power supply control described above. The way to reduce power consumption may be, for example, controlling power-on/off of clock gates that control supply and stop of clock signals for the respective modules in the semiconductor integrated circuits 601a and 601b.

The semiconductor integrated circuits 601a and 601b are semiconductor devices with the same arrangement on which the same silicon die is mounted. The semiconductor integrated circuits 601a and 601b have a main mode in which they control startup of the system of the MFP 102 and control the entire MFP 102, and an expansion mode in which they mainly provide control associated with some function of the MFP 102, and more specifically, the printing function of the MFP 102. The semiconductor integrated circuits 601a and 601b operate in the main mode or the expansion mode in accordance with operating mode settings made by the mode setting circuits 204a and 204b. The present embodiment is based on the assumption that, for example, the semiconductor integrated circuit 601a is placed in the main mode, and the semiconductor integrated circuit 601b is placed in the expansion mode. Since the semiconductor integrated circuits 601a and 601b have the same arrangement, the following description of their arrangement is given by taking the semiconductor integrated circuit 601a as an example.

The semiconductor integrated circuit 601a has a clock control unit 602a, a PMU 603a, and a BW-specific image processing unit 604a as well as the component elements of the semiconductor integrated circuit 209a. The PMU 603a is connected to the system bus 220a, and the BW-specific image processing unit 604a is connected to the image bus 221a.

The clock control unit 602a controls supply of clock signals to the modules of the semiconductor integrated circuit 601a. The PMU 603a controls supply of power to the semiconductor integrated circuit 601a. The PMU 603a is a hardware sequencer circuit which carries out an initialization process for the semiconductor integrated circuit 601a based on setting values (setting data) set in advance. The BW-specific image processing unit 604a is an image processing module designed exclusively for black-and-white images and subjects print output images to processing such as smoothing and thickening of thin lines.

Figure 7:
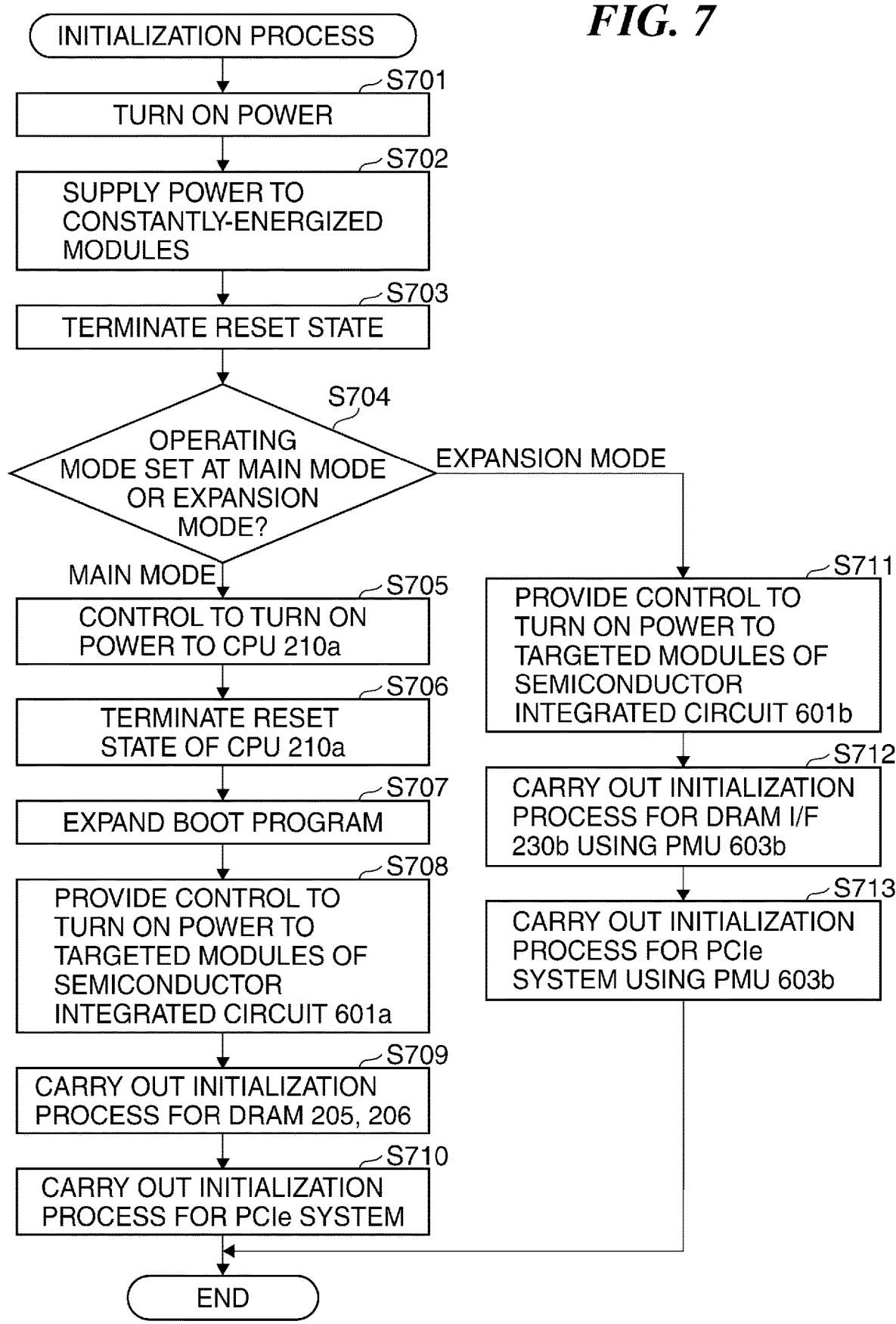
FIG. 7 is a flowchart showing the procedure of an initialization process which is carried out by the main controller appearing in FIGS. 6A and 6B.

FIG. 7 is a flowchart showing the procedure of the initialization process which is carried out by the main controller 600 in FIGS. 6A and 6B.

Referring to FIG. 7, first, when power-on of the main controller 600 is started (step S701), power is supplied to the semiconductor integrated circuits 601a and 601b and the ROM 201 of the main controller 600. As a result, the semiconductor integrated circuits 601a and 601b carry out the resetting process and stand by until they are instructed to terminate the reset state. Next, the main controller 600 supplies power to constantly-energized modules (step S702) and terminates the reset state of the constantly-energized modules of the semiconductor integrated circuits 601a and 601b (step S703). This makes the PMUs 603a and 603b operable. Then, the main controller 600 obtains information on operating mode settings made by the mode setting circuits 204a and 204b from the respective general-purpose input-output I/Fs 213a and 213b. After that, based on the obtained information, the main controller 600 determines whether the operating modes set for the semiconductor integrated circuits 601a and 601b are the main mode or the expansion mode (step S704).

As a result of the determination in the step S704, for the semiconductor integrated circuit 601a placed in the main mode, the main controller 600 provides control to turn on the power to the CPU 210a using the PMU 603a (step S705). When the power to the CPU 210a is controlled to be turned on, power is supplied to the CPU 210a, causing the CPU 210a to carry out the resetting process. The CPU 210a stands by until it is instructed to terminate the reset state. Also, during the control to turn on the power to the CPU 210a, oscillation timing of clocks is controlled by the clock control unit 602a. The main controller 600 then terminates the reset state of the CPU 210a (step S706). This makes the CPU 210a operable.

Figure 8A:
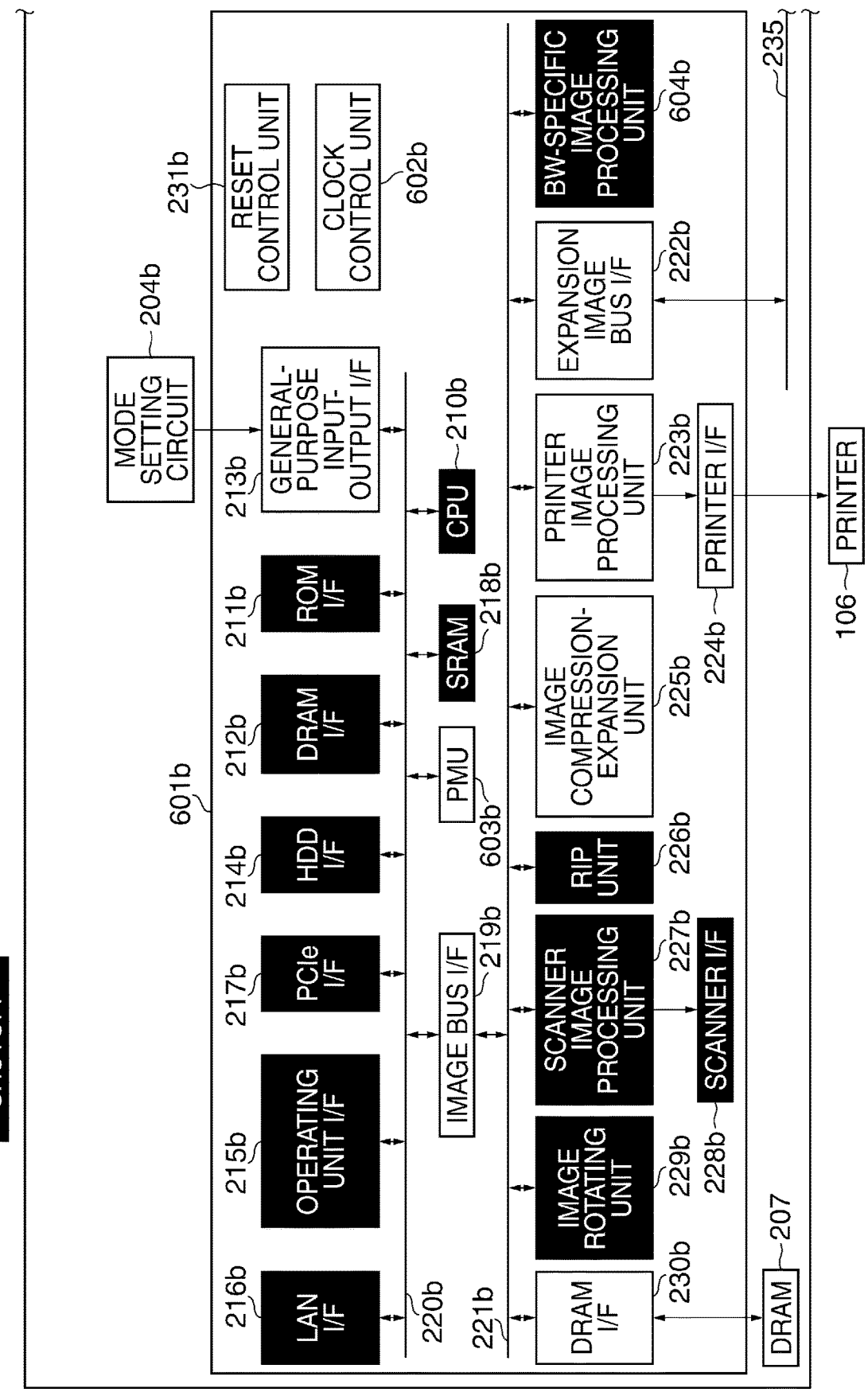
FIGS. 8A and 8B are diagrams useful in explaining power-on control in the main controller appearing in FIGS. 6A and 6B.
Figure 8B:
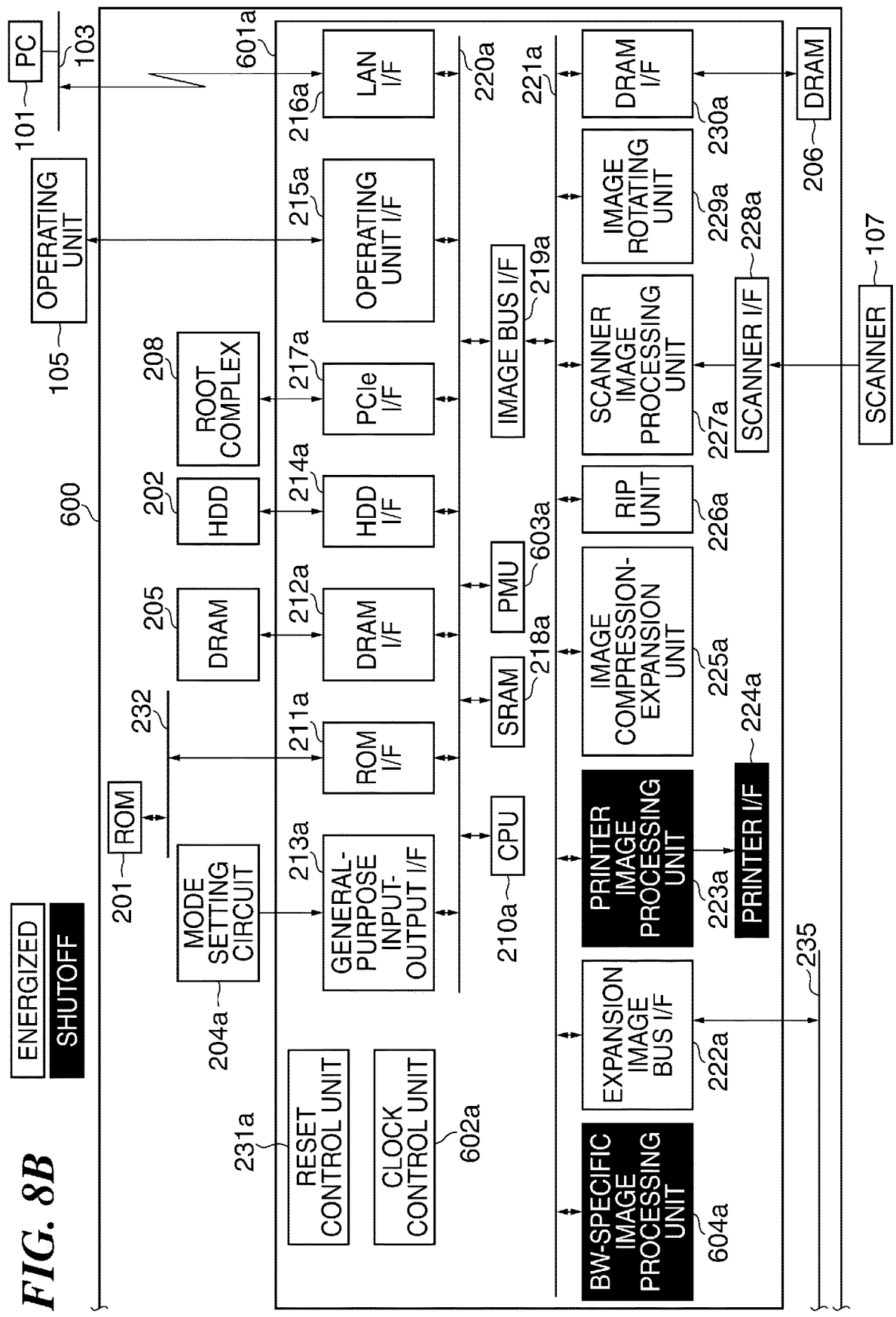

Then, in the main controller 600, the CPU 210a reads out the boot program from the ROM 201 and expands the boot program into the SRAM 218a (step S707). After that, the CPU 210a provides control to turn on the power to target modules of the semiconductor integrated circuit 601a based on the boot program expanded into the SRAM 218a (step S708). The target modules of the semiconductor integrated circuit 601a are those associated with the operating mode set for the semiconductor integrated circuit 601a among the modules of the semiconductor integrated circuit 601a except the constantly-energized modules and the CPU 210a. For example, when the MFP 102 is used as a color printing apparatus, and the semiconductor integrated circuit 601b placed in the expansion mode is connected to the MFP 102, the target modules of the semiconductor integrated circuit 601a are modules other than the constantly-energized modules, the CPU 210a, the BW-specific image processing unit 604a, the printer image processing unit 223a, and the printer I/F 224a. As a result, in the semiconductor integrated circuit 601a, power is supplied to the targeted modules of the semiconductor integrated circuit 601a as well as the constantly-energized modules and the CPU 210a as shown in FIGS. 8A and 8B.

Then, based on the boot program, the CPU 210a carries out the initialization process for the DRAMs 205 and 206 (step S709). It is assumed that DRAMs with various types of specifications are connected to the semiconductor integrated circuit 601a, and setting values in the initialization process vary with types, capacities, processing speeds, etc. of the DRAMs. For this reason, in the semiconductor integrated circuit 601a placed in the main mode, the boot program needs to be changed according to a specification of a DRAM connected the semiconductor integrated circuit 601a. The CPU 210a then carries out the initialization process for the PCIe system in the semiconductor integrated circuit 601a based on the boot program (step S710). In the initialization process for the PCIe system as well, the boot program needs to be changed according to a specification of a DRAM connected to the semiconductor integrated circuit 601a. Namely, in the present embodiment, the initialization process using the boot program stored in the ROM 201 is carried out for the semiconductor integrated circuit for which the initialization process needs to be carried out with the boot program changed. After that, the CPU 210a ends the present process.

As a result of the determination in the step S704, for the semiconductor integrated circuit 601b placed in the expansion mode, the main controller 600 provides control to turn on the power to target modules of the semiconductor integrated circuit 601b using the PMU 603b (step S711). The target modules of the semiconductor integrated circuit 601b are modules associated with the operating mode set for the semiconductor integrated circuit 601b among the modules of the semiconductor integrated circuit 601b except the constantly-energized modules and the CPU 210b. Specifically, the target modules of the semiconductor integrated circuit 601b are the image bus I/F 219b, the expansion image bus I/F 222b, the printer image processing unit 223b, the printer I/F 224b, the image expansion-compression unit 225b, and the DRAM I/F 230b. As a result, in the semiconductor integrated circuit 601b, power is supplied to the target modules of the semiconductor integrated circuit 601b as well as the constantly-energized modules as shown in FIGS. 8A and 8B.

Here, since the functions used in the semiconductor integrated circuit 601b are limited, specifications of a DRAM connected thereto are conceivable beforehand. In the present embodiment, for a semiconductor integrated circuit such as the semiconductor integrated circuit 601b to which a DRAM with specifications conceivable beforehand is connected, the initialization process is carried out using the PMU 603b, not the boot program. According to specifications of conceivable DRAMs, setting values for use in the initialization process for the DRAMs and setting values for use in the initialization process for the PCIe system are set in advance in the PMU 603b. In the initialization process using the PMU 603b, the CPU 210b is not run, and hence power consumption required for execution of the initialization process using the PMU 603b is lower than that required for execution of the initialization process using the boot program.

Then, the main controller 600 carries out the initialization process for the DRAM I/F 230b using the PMU 603b (step S712), carries out the initialization process for the PCIe system in the semiconductor integrated circuit 601b using the PMU 603b (step S713), and ends the present process.

In the process in FIG. 7 described above, when the initialization processes are to be carried out for the semiconductor integrated circuits 601a and 601b, whether to carry out the initialization processes using the boot program or carry out the initialization processes using the PMU is determined based on operating mode settings on the semiconductor integrated circuits 601a and 601b. Namely, it is possible to carry out the initialization processes using a method other than the method involving the obtainment of the boot program from the ROM 201, and hence the MFP 102 does not have to be equipped with a plurality of ROMs for the respective semiconductor integrated circuits 601a and 601b. This reduces parts count for the MFP 102 and thus lowers production costs.

Moreover, in the process in FIG. 7 described above, power consumption required for execution of the initialization process using the PMU 603b is lower than that required for execution of the initialization process using the boot program. This reduces power consumption as compared to the case where the boot program is always used to carry out the initialization processes.

It should be noted that the number of semiconductor integrated circuits provided in each of the main controllers 104 and 600 may be three or more, and the semiconductor integrated circuits may have operating modes other than the main mode and the expansion mode.

In the embodiments described above, after the process in the step S407 in FIG. 4 is carried out, the processes in the steps S704 and the subsequent steps may be carried out in the semiconductor integrated circuit 209b. Specifically, when the initialization process for the semiconductor integrated circuit 601b is to be carried out after the semiconductor integrated circuit 601a out of the semiconductor integrated circuit 601a and 601b obtains the initialization execution data from the ROM 201, whether to carry out the initialization process using the boot program or carry out the initialization process using the PMU is determined based on a setting on the operating mode of the semiconductor integrated circuits 601b. This reduces power consumption as compared to the case where the initialization processes for both the semiconductor integrated circuits 601a and 601b are carried out using the boot program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165740, filed Aug. 26, 2016 which is hereby incorporated by reference herein in its entirety.

What is claimed is:

1. An information processing apparatus comprising:
  a first semiconductor device configured to include a processor and have a terminal configured at least to output a signal;
  a second semiconductor device configured to include a processor and have a terminal configured at least to output a signal;
  a storage device configured to store both a first boot program for the processor of the first semiconductor device and a second boot program for the processor of the second semiconductor device, and to have a terminal into which the signal outputted from the terminal of the first semiconductor device is inputted and into which the signal outputted from the terminal of the second semiconductor device is inputted; and a signal line connected to each of the terminal of the first semiconductor device, the terminal of the second semiconductor device, and the terminal of the storage device, such that the signal outputted from the terminal of the first semiconductor device reaches the terminal of the second semiconductor device and the terminal of the storage device, and the signal outputted from the terminal of the second semiconductor device reaches the terminal of the first semiconductor device and the terminal of the storage device, wherein based on the first semiconductor device being reset, the first semiconductor device reads out the first boot program from the storage device via the signal line, based on the second semiconductor device being reset, the second semiconductor device reads out the second boot program from the storage device via the signal line, and while the first semiconductor device is reading out the first boot program from the storage device, an output from the terminal of the second semiconductor device connected to the signal line is controlled so that the output does not reach the storage device, and wherein the first semiconductor device performs first image processing on input data, and the second semiconductor device performs second image processing, which is different from the first image processing, on the data on which the first image processing has been performed.

2. The information processing apparatus according to claim 1, wherein the first semiconductor device and the second semiconductor device are semiconductor integrated circuits that have a plurality of functions and a control terminal for setting at least one of the plurality of functions, and on which the same silicon die is mounted.

3. The information processing apparatus according to claim 2, wherein the second semiconductor device further comprises:

a first initialization unit configured to read out the second boot program from the storage device and carry out an initialization process for the second semiconductor device based on the second boot program;

a second initialization unit configured to carry out the initialization process for the second semiconductor device based on setting data set in advance; and a determination unit configured to determine whether to carry out the initialization process for the second semiconductor device using the first initialization unit or carry out the initialization process for the second semiconductor device using the second initialization unit, wherein power consumption required for execution of the initialization process using the second initialization unit is lower than power consumption required for execution of the initialization process using the first initialization unit, and when the initialization process for the second semiconductor device is to be carried out after the first semiconductor device reads out the first boot program from the storage device, the determination unit determines whether to carry out the initialization process for the second semiconductor device using the first initialization unit or carry out the initialization process for the second semiconductor device using the second initialization unit based on a setting at the control terminal of the second semiconductor device.

4. The information processing apparatus according to claim 2, wherein readout of the first or second boot program by one of the first semiconductor device and the second semiconductor device for which a function associated with startup of a system of the information processing apparatus is set is given high priority.

5. The information processing apparatus according to claim 1, wherein the first semiconductor device inputs a request signal to request the first boot program from the terminal of the first semiconductor device via the signal line into the terminal of the storage device, and reads out the first boot program from the storage device based on input of the request signal from the first semiconductor device, and wherein the second semiconductor device inputs a request signal to request the second boot program from the terminal of the second semiconductor device via the signal line into the terminal of the storage device, and reads out the second boot program from the storage device based on input of the request signal from the second semiconductor device.

6. The information processing apparatus according to claim 1, wherein the first boot program is a boot program for the first semiconductor device and the second boot program is a boot program for the second semiconductor device.

7. The information processing apparatus according to claim 1, wherein power is supplied to the second semiconductor device while the first semiconductor device is reading out the first boot program from the storage device.

8. The information processing apparatus according to claim 7, wherein the second semiconductor device controls the output from the terminal of the second semiconductor device so as to be a high impedance state, after starting power supply to the second semiconductor device until receiving a control signal to terminate the high impedance state of the output from the terminal of the second semiconductor device from the first semiconductor device.

9. The information processing apparatus according to claim 8, wherein after reading out the first boot program from the storage device, the first semiconductor device sets an output from the terminal of the first semiconductor device so as to be a high impedance state, and subsequently outputs the control signal to terminate the high impedance state of the output from the terminal of the second semiconductor device to the second semiconductor device.

10. The information processing apparatus according to claim 9, wherein the second semiconductor device reads out the second boot program from the storage device while the output from the terminal of the first semiconductor device having read out the first boot program from the storage device is the high impedance state.

11. The information processing apparatus according to claim 1, wherein the second semiconductor device includes a buffer which has an input terminal, an output terminal configured to output a signal inputted into the input terminal, and a control terminal into which a control signal to control whether or not an output from the output terminal is set to be a high impedance state irrespective of the signal inputted into the input terminal is inputted, the output terminal being connected to the terminal of the second semiconductor device connected to the signal line, and wherein the control signal setting the output from the output terminal of the buffer so as to be the high impedance state is continuously inputted into the control terminal while the first semiconductor device is reading out the first boot program from the storage device.

12. The information processing apparatus according to claim 11, wherein the second semiconductor device, from the first semiconductor device, receives a buffer control signal to terminate the high impedance state of the output from the terminal of the second semiconductor device, and wherein, based on receiving the buffer control signal, the control signal setting the output from the output terminal of the buffer so as to be the high impedance state is stopped to be inputted into the control terminal.

13. An information processing apparatus comprising:

a first semiconductor device and a second semiconductor device, wherein a silicon die of the first semiconductor device and a silicon die of the second semiconductor device are the same and separated from each other;

a storage device configured to store at least a boot program for the first semiconductor device; and an interface for communicating with the storage device, wherein in response to the first semiconductor device being reset, the first semiconductor device reads out the boot program for the first semiconductor device from the storage device via the interface, and carries out an initialization process to initialize a first memory based on the boot program;

in response to the second semiconductor device being reset, the second semiconductor device carries out an initialization process to initialize a second memory based on setting data set in advance for the second semiconductor device without using a boot program from the storage device to initialize the second memory, and wherein the first semiconductor device performs first image processing on input data, and the second semiconductor device performs second image processing, which is different from the first image processing, on the data on which the first image processing has been performed.

14. The information processing apparatus according to claim 13, wherein power consumption required for execution of the initialization process based on the setting data is lower than power consumption required for execution of the initialization process based on the boot program.

15. The information processing apparatus according to claim 13, further comprising a DRAM and PCIe system, wherein the initialization process includes an initialization process for the DRAM and an initialization process for the PCIe system.

16. A control method for an information processing apparatus that has a first semiconductor device that includes a processor and has a terminal that at least outputs a signal, a second semiconductor device that includes a processor and has a terminal that at least outputs a signal, a storage device that stores both a first boot program for the processor of the first semiconductor device and a second boot program for the processor of the second semiconductor device, and has a terminal into which the signal outputted from the terminal of the first semiconductor device is inputted and into which the signal outputted from the terminal of the second semiconductor device is inputted, and a signal line connected to each of the terminal of the first semiconductor device, the terminal of the second semiconductor device, and the terminal of the storage device, such that the signal outputted from the terminal of the first semiconductor device reaches the terminal of the second semiconductor device and the terminal of the storage device, and the signal outputted from the terminal of the second semiconductor device reaches the terminal of the first semiconductor device and the terminal of the storage device, the control method comprising:

based on the first semiconductor device being reset, the first semiconductor device reading out the first boot program from the storage device via the signal line, based on the second semiconductor device being reset, the second semiconductor device reading out the second boot program from the storage device via the signal line, and while the first semiconductor device is reading out the first boot program from the storage device, an output from the terminal of the second semiconductor device connected to the signal line is controlled so that the output does not reach the storage device, wherein the first semiconductor device performs first image processing on input data, and the second semiconductor device performs second image processing, which is different from the first image processing, on the data on which the first image processing has been performed.

17. A control method for an information processing apparatus that has a first semiconductor device and a second semiconductor device wherein a silicon die of the first semiconductor device and a silicon die of the second semiconductor device are the same and separated from each other, a storage device that stores at least a boot program for the first semiconductor device, and an interface for communicating with the storage device, the control method comprising:

in response to the first semiconductor device being reset, the first semiconductor device reading out the boot program for the first semiconductor device from the storage device via the interface, and carrying out an initialization process to initialize a first memory based on the boot program; and in response to the second semiconductor device being reset, the second semiconductor device carrying out an initialization process to initialize a second memory based on setting data set in advance for the second semiconductor device without using a boot program from the storage device to initialize the second memory, wherein the first semiconductor device performs first image processing on input data, and the second semiconductor device performs second image processing, which is different from the first image processing, on the data on which the first image processing has been performed.

* * * * *